March 11, 1941. E. A. JOHNSTON 2,234,599
TRACTOR-MOUNTED RECEPTACLE
Filed Aug. 3, 1938 3 Sheets-Sheet 1
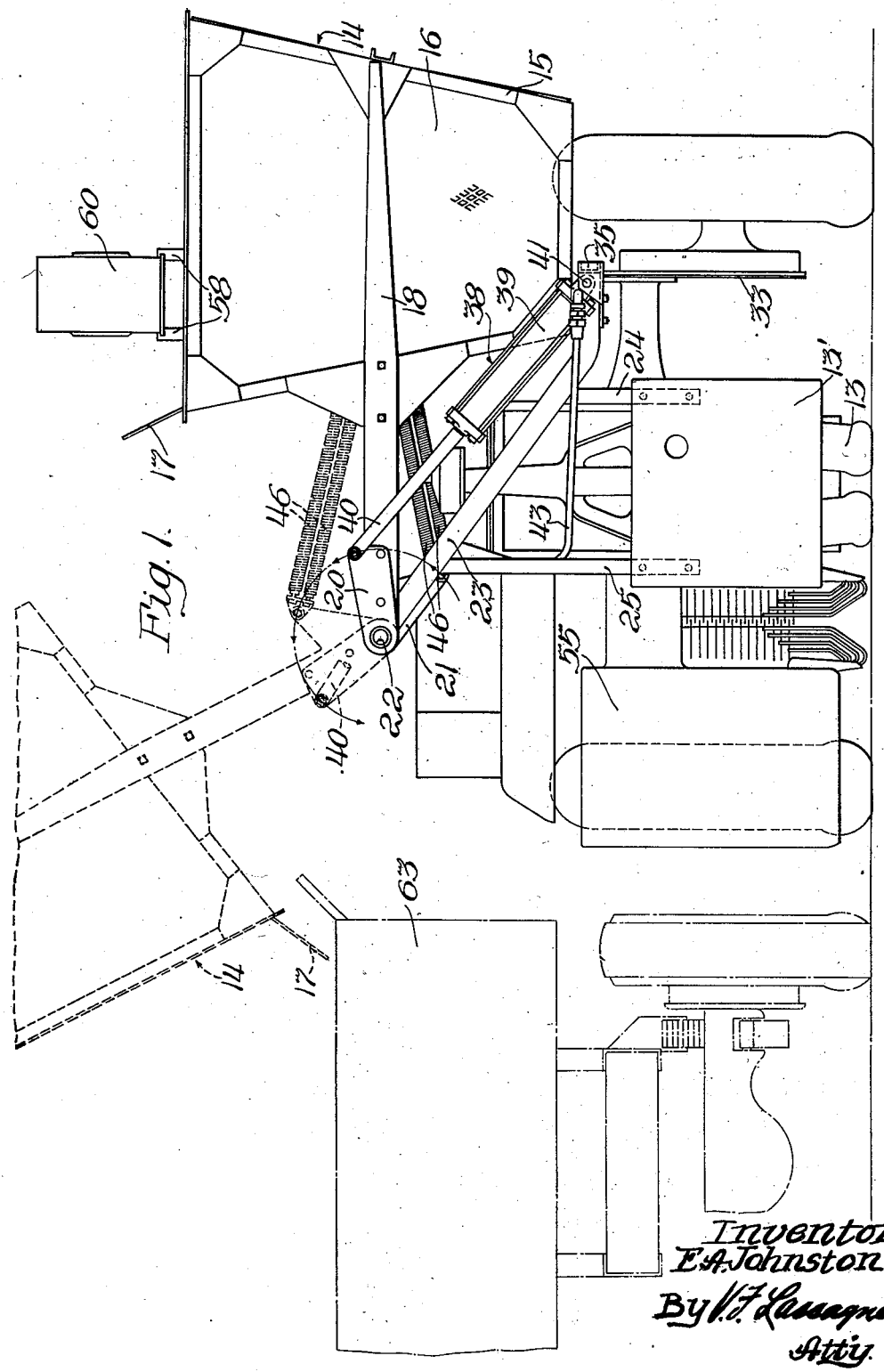
Inventor
E.A. Johnston
By V.F. Lasagne
Atty.

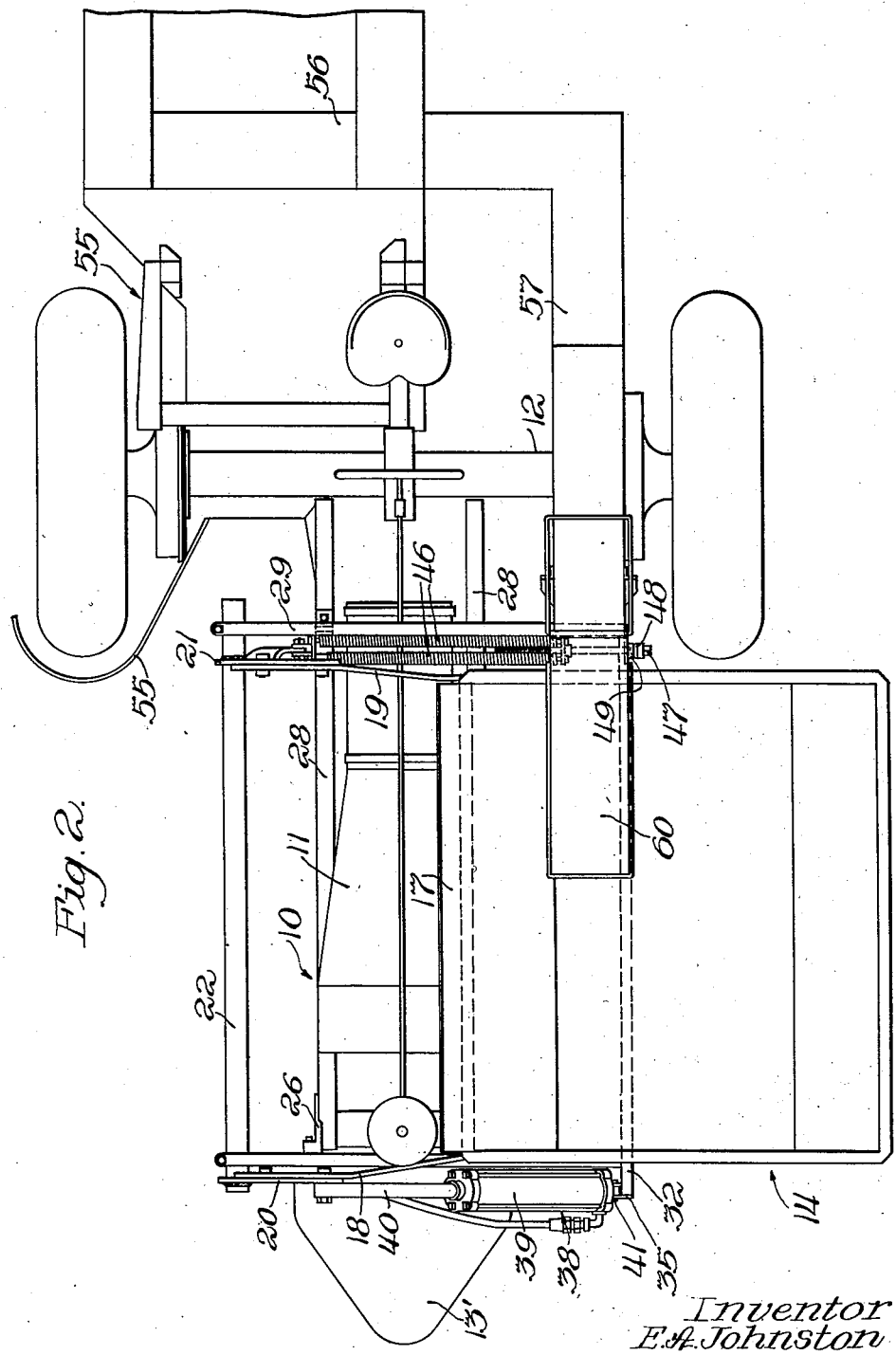

March 11, 1941. E. A. JOHNSTON 2,234,599
TRACTOR-MOUNTED RECEPTACLE
Filed Aug. 3, 1938 3 Sheets-Sheet 3
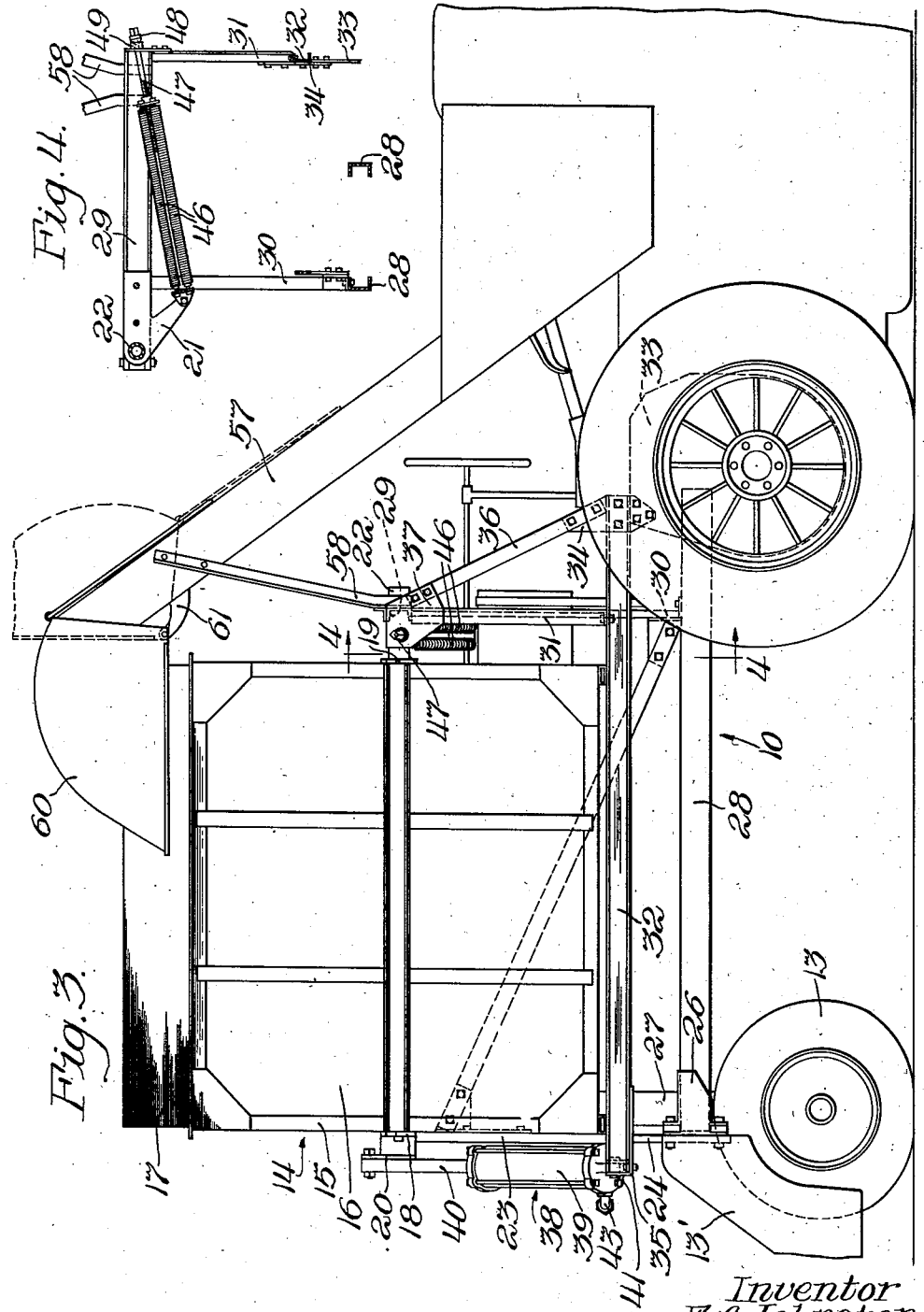
Inventor
E. A. Johnston
By [signature]
Att'y.

Patented Mar. 11, 1941

2,234,599

UNITED STATES PATENT OFFICE 2,234,599

TRACTOR-MOUNTED RECEPTACLE

Edward A. Johnston, Chicago, Ill., assignor to International Harvester Company, a corporation of New Jersey Application August 3, 1938, Serial No. 222,740

11 Claims. (Cl. 214—77)

This invention relates to a dump truck mounted on a tractor. More specifically it relates to a receptacle, which is mounted on a tractor along with a cotton picker unit and which receives cotton from the picker unit, and which can be swung across the tractor for dumping.

Normally, in tractor mounted cotton pickers, the cotton picked is conveyed from the picker unit to sacks, which are carried alongside of the tractor body. The removal of these sacks and the emptying of them into a larger receptacle is generally a difficult and inconvenient operation. It has been proposed to provide quite large receptacles on the tractor for receiving cotton from the picker unit, but the emptying of such a receptacle is also a problem.

An object of the invention is to mount a receptacle on a tractor so that it may be easily dumped.

Another object of the invention is to provide on a tractor, in connection with a cotton picker unit, a receptacle which receives cotton from the picker unit and which can be emptied easily.

Still another object of the invention is the mounting of a receptacle on a narrow bodied tractor, so that it may be emptied easily.

A further object of the invention is to mount a receptacle on a tractor in such a way that it is positioned on one side of the tractor and swings to a dumping position about an axis on the other side of the tractor.

According to the present invention, a receptacle is positioned alongside of the narrow body of a tractor having also a wide rear axle structure and a narrow front truck. The receptacle is arranged to swing about a pipe as an axis to dumping position, which pipe is held on the opposite side of the body of the tractor by means of supporting members extending from the tractor. A cotton picker is also mounted on the tractor, but on the side opposite the receptacle, and conveyors bring the cotton from the picker unit to the receptacle.

In the drawings:

Figure 1 shows the front view of a tractor with a dumping receptacle and picker unit mounted thereon;

Figure 2 shows a plan view of this structure;

Figure 3 shows a side view of the same structure; and

Figure 4 is a section taken along the lines 4—4 of Figure 3.

A tractor 10 has a narrow body portion 11, a wide tread rear axle structure 12, and a narrow front truck 13 with a shield 13'. Positioned at one side of the narrow body portion is a cotton receptacle 14, which is formed of a framework 15 covered by a wire mesh 16. In one side of the receptacle is a sheet 17, which aids the dumping of cotton from the receptacle when it is swung to the dumping position, as shown in dotted lines in Figure 1. If there were no sheet 17 at the particular side of the receptacle, but only wire mesh, dumping would be difficult, since the cotton would stick to the wire mesh.

Extending laterally from the ends of the receptacle are strap members 18 and 19, which are attached to plate 20 and V-member 21, in turn, attached, as by welding, to a shaft or pipe 22 on the side of the narrow body portion opposite the receptacle and paralleling the body portion. At its front end, this shaft 22 is supported by a diagonal member 23, in turn supported by upstanding members 24 and 25 bolted to brackets 26 on opposite sides of a bolster portion 27 connected with the front truck 13. These bracket members 26 are also attached to longitudinal channel members 28 attached at their rear to the rear axle structure 12, said members 28 constituting the tractor body frame. As seen in Figure 4, the rear end of the shaft 22 is supported by a cross channel member 29, in turn supported by upstanding members 30 and 31. The upstanding member 30 is secured to the one channel 28, and the upstanding member 31 is secured to a channel member 32 upwardly and outwardly of the other channel member 28 and carried at one end on a flange 33 of the rear axle structure by a plate 34, and at the front end by the lower end of the diagonal member 23 with the aid of a bracket member 35. A brace 36 also helps to support one end of the channel 29 and extends diagonally from said channel 29 by means of a plate connection 37 to a connection with the plate member 34 on the rear axle flange 33.

As previously stated, the receptacle is adapted to be swung from the full line position to the dotted line position in Figure 1 for dumping. This is accomplished by means of a power lift mechanism 38, which is not shown in detail, since it forms no part of the present invention and is fully described in Patent 2,109,668 to Edward A. Johnston et al., of March 1, 1938. Suffice it to say that the mechanism comprises essentially a cylinder 39 with a push rod 40 extending into it and adapted to be moved in a direction out of the cylinder by means of fluid pressure.

The lower end of the power lift mechanism 38 is pivotally supported, as at 41, in the bracket 35, and the rod 40 at the upper end of the lift mechanism is pivotally attached to the plate 20 fixed to the strap 18. A conduit 43 is connected with the power lift mechanism and adapted to apply fluid pressure to the mechanism from a suitable control (not shown) within reach of the operator of the tractor.

To one leg of the V-member 21 supporting the rear end of the receptacle is secured a pair of coil springs 46. At the other end of the springs a bolt 47 is attached. The bolt 47 has a spherical head portion 48, which rests in a correspondingly shaped bearing portion 49 fixed to the plate 37. The springs 46 and bolt 47 tend to pull the receptacle away from its dumping position.

When the receptacle is to be swung to dumping position, fluid pressure is applied through the conduit 43 to the lifting mechanism 38, and the member 40 moves out of the cylinder 39. This action swings the receptacle to dumping position. At the start of the movement, the springs 46 assist the lifting mechanism in that they tend to move to a dead center position on a line through the shaft 22. Beyond this position they resist the lifting mechanism, tending to return to the dead center position. When the dumping is completed, pressure to the lifting mechanism is released, and the springs 46 pull the empty receptacle, at least, to a position over the shaft 22 from which gravity assists in bringing the receptacle back to original loading position. The spherical head 48 of the bolt 47, and the bearing portion 49 allow the necessary angular movement of the coil springs 46 and bolt 47 in moving to dumping position.

On the side of the tractor opposite the receptacle a cotton picker unit 55 is supported from the rear axle structure. This unit is shown only diagrammatically, since it forms no part of the present invention and is completely shown in copending application Serial No. 175,199 of Edward A. Johnston, filed November 18, 1937.

There is a conveyer 56 extending crosswise of the picker unit, as well as a conveyer 57 extending forwardly and upwardly over the receptacle 14 from the conveyer 56. The conveyer 57 is supported by angle members 58 attached to the cross channel member 29. At the upper end of the conveyer 57, a spout 60 is pivoted on members 61, so as to extend over the receptacle 14. When the receptacle is to be dumped, the spout is moved to the dotted line position in Figure 3, so that the receptacle will clear it.

With the arrangement shown, a very compact and novel structure has been obtained. Since the receptacle is positioned on one side of the body portion of a tractor and is pivoted about an axis on the other side of the body portion, the receptacle is swung about a considerable radius, so that it may clear the side of the tractor and empty into a truck 63 alongside of the tractor. At the same time, the receptacle in normal receiving position does not extend very much outside of the wheel line of the tractor and so the over-all width of the tractor is not appreciably increased.

It will be apparent that the particular form of receptacle shown need not be used with the particular cotton picker shown, nor with any cotton picker. It is capable of use with other types of picking units and may even be carried alone on the tractor.

It is the intention to limit the scope of the invention only to the terms of the appended claims.

What is claimed is:

1. The combination with a tractor having a body, an extended axle and wheels at one end, and a truck at the other end, of a receptacle positioned at one side of the body and means swingingly mounting the receptacle on the tractor about an axis on the other side of the body.

2. The combination with a tractor having a body supported at one end on an extended axle and wheels and at the other end on a truck, of a receptacle positioned at one side of the body and means pivotally mounting the receptacle on the tractor on an axis located on the other side of the body in a plane substantially at right angles to the extended axle.

3. The combination with a tractor having a longitudinal center line, of a receptacle, a portion of which is positioned on one side of the said longitudinal center line and means pivotally mounting the receptacle on the tractor on an axis on the other side of the longitudinal center line.

4. The combination with a tractor having a narrow body portion, a wide tread rear axle structure, and a narrow front truck, of a receptacle positioned at one side of the body portion and means swingingly mounting the receptacle on an axis on the other side of the body portion somewhat above the body portion and paralleling it.

5. The combination with a tractor having a narrow body portion, of a receptacle positioned adjacent the body portion and means swingingly mounting the receptacle on the tractor about an axis substantially parallel to the body portion and to one side of the center line thereof.

6. The combination with a tractor having a narrow body portion, of a receptacle positioned at one side of the body portion and means swingingly mounting the receptacle on the tractor on an axis on the other side of the narrow body portion and paralleling it.

7. The combination with a tractor having a narrow body portion, a wide tread rear axle structure, and a narrow front truck, of a pair of members fixed to the tractor adjacent the front truck and spaced from one another the width of the narrow body portion, a pair of members fixed to the tractor adjacent the rear of the narrow body portion, cross members fixed to the pairs of members, a shaft supported by the cross members to one side of and parallel to the narrow body portion, and a receptacle positioned on the opposite side of the narrow body portion and pivotally mounted on the shaft by means of straps connecting the shaft and receptacle.

8. The combination with a tractor having a narrow body portion and a wide tread rear axle structure, of a shaft supported by the tractor above and parallel to the narrow body portion, a receptacle positioned on the opposite side of the narrow body portion, straps connecting from spaced points on the shaft and the ends of the receptacle, a lifting mechanism for swinging the receptacle about the shaft, connected to one strap and to the frame, and a spring connecting the other strap and the frame for preventing the receptacle from straining the lifting mechanism when the receptacle is swung into emptying position on the same side of the narrow body portion as the shaft about which it swings.

9. In combination, a tractor having a narrow body portion, a receptacle positioned on one side of the body portion, means pivotally mounting the receptacle on the tractor about an axis on the other side of the body portion, and power lifting mechanism actuated by the tractor for swinging the receptacle over the body portion of the tractor.

10. In combination, a tractor having a body portion, a receptacle positioned on one side thereof and means pivotally mounting the receptacle about an axis on the other side of the tractor, and power lifting mechanism for swinging the receptacle over the body portion of the tractor.

11. The combination with a tractor having a body, of a receptacle having a portion on one side of the longitudinal center line of the body, means pivotally connecting the receptacle to the tractor on a longitudinal axis at the other side of the center line of the body, and lifting means for swinging the receptacle about its axis of pivotal connection, whereby, when the receptacle is swung, it is simultaneously lifted to discharge at a high level.

EDWARD A. JOHNSTON.